L. J. BAYER.

BOILER CLEANER.

APPLICATION FILED OCT. 25, 1911.

Reissued Apr. 18, 1916.

14,117.

2 SHEETS—SHEET 1.

WITNESSES:

Harry A. Beinez

Joseph Schef

INVENTOR.

Leo John Bayer.

BY Ernst Starck

ATTORNEY.

L. J. BAYER.

BOILER CLEANER.

APPLICATION FILED OCT. 25, 1911.

Reissued Apr. 18, 1916.

14,117.

2 SHEETS—SHEET 2.

WITNESSES:

Harry A. Beimes.

Josam Michel

INVENTOR.

Leo John Bayer.

BY Ernest Starer

ATTORNEY.

UNITED STATES PATENT OFFICE.

LEO JNO. BAYER, OF ST. LOUIS, MISSOURI.

BOILER-CLEANER.

14,117. Specification of Reissued Letters Patent. Reissued Apr. 18, 1916.

Original No. 978,830, dated December 20, 1910, Serial No. 553,411. Application for reissue filed October 25, 1911. Serial No. 656,973.

*To all whom it may concern:*

Be it known, that I, LEO JOHN BAYER, a citizen of the United States, residing at St. Louis, State of Missouri, have invented certain new and useful Improvements in Boiler-Cleaners, of which the following is a full, clear, and exact description, reference being had to the accompanying drawings, forming a part hereof.

My invention has relation to improvements in boiler cleaners; and it consists in the novel details of construction more fully set forth in the specification and pointed out in the claims.

Figure 1:
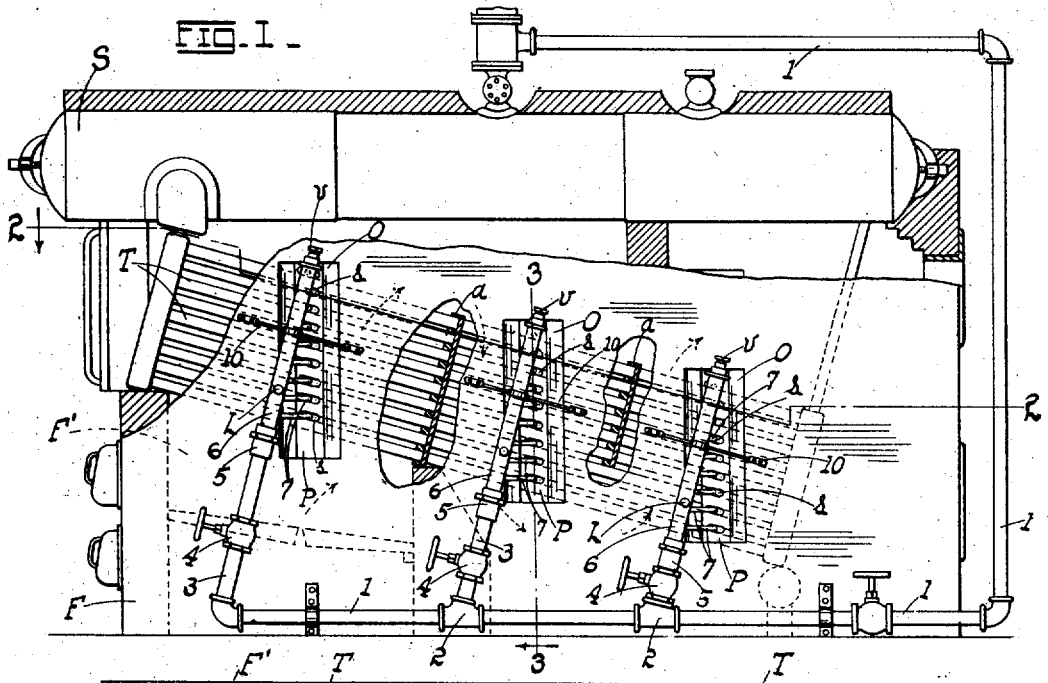
Figure 2:
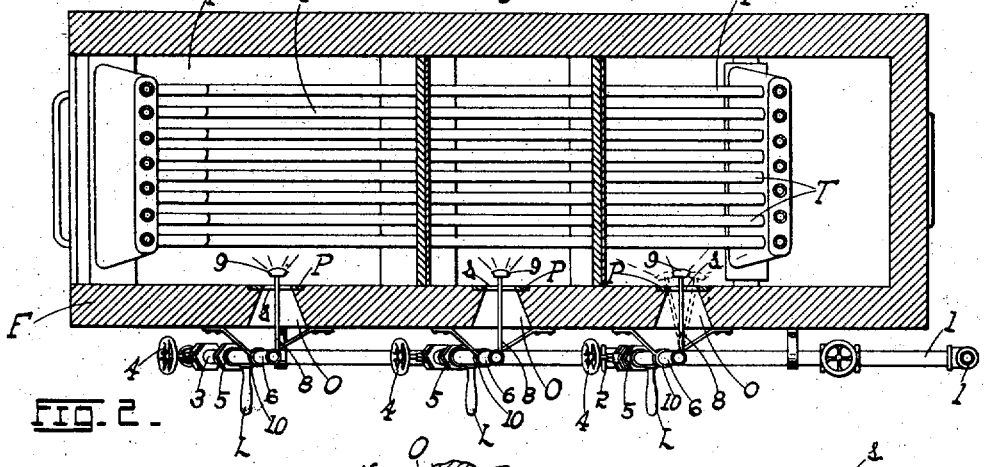
Figure 3:
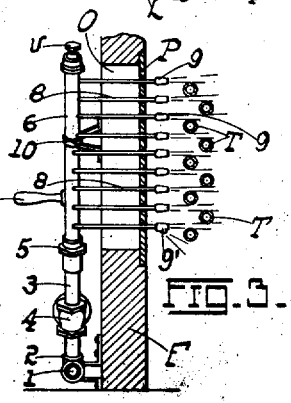
Figure 4:
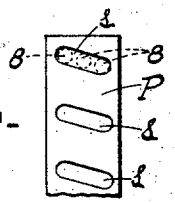
Figure 5:
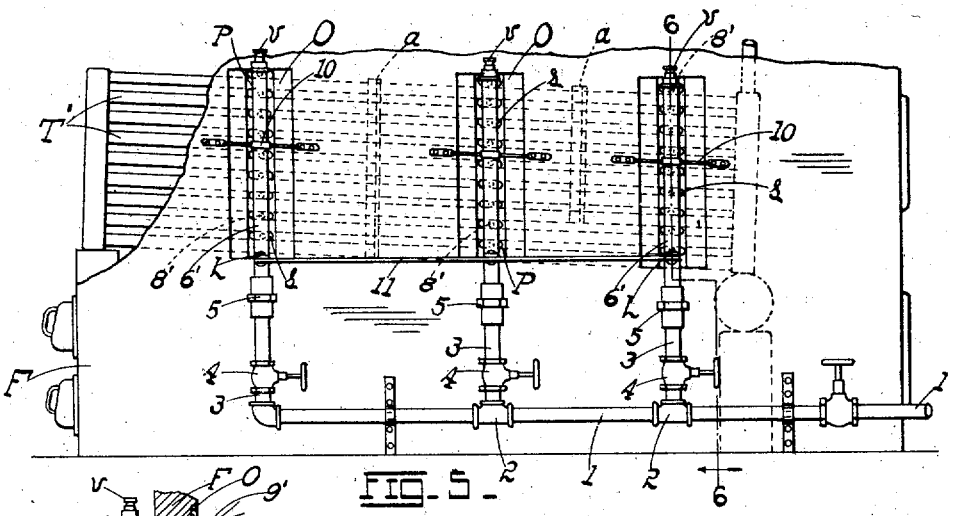
Figure 6:
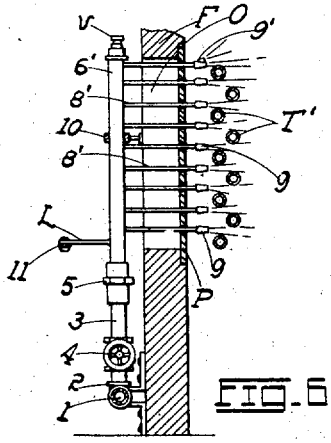
Figure 7:
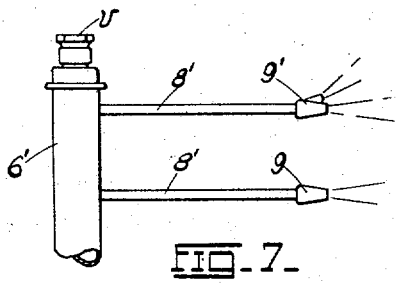
Figure 8:
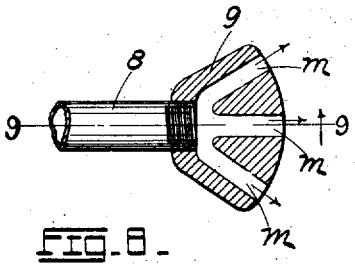
Figure 9:
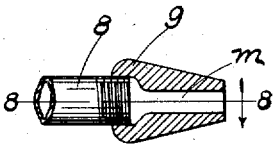
Figure 10:
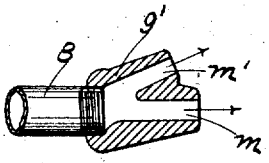
Figure 11:
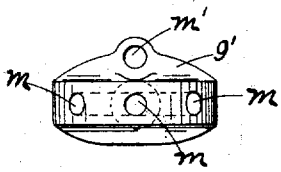

In the drawings, Figure 1 is a side elevation of one form of boiler showing my invention applied thereto; Fig. 2 is a horizontal section on the zig-zag line 2—2 of Fig. 1; Fig. 3 is a vertical transverse section on the line 3—3 of Fig. 1; Fig. 4 is a detail plan of the plate (partly broken) closing the opening in the wall of the furnace through which the spray-nozzles play; Fig. 5 is a side elevation of a modified boiler showing a modified form of my invention applied thereto; Fig. 6 is a vertical transverse section on the line 6—6 of Fig. 5; Fig. 7 is an enlarged elevational detail of the header with spray nozzles attached directly thereto; Fig. 8 is a horizontal section of the spray-head on the line 8—8 of Fig. 9; Fig. 9 is a vertical section on the line 9—9 of Fig. 8; Fig. 10 is a section corresponding to Fig. 9 of the terminal spray-head of the series; and Fig. 11 is an end view of Fig. 10.

The object of my invention is to direct sprays, jets, or sheets of steam (or equivalent fluid) into and through the spaces between the tubes of a water-tube boiler for purposes of cleaning the tubes of any accumulations of soot, dirt, ashes and the like, suitable provision being made to sweep the entire area of the tubes by such cleaning agent with a view of removing the accumulations throughout the full length of the boiler.

A further object is to direct the cleaning agent or portions of it in the general direction of the draft, so that the draft may be materially assisted during the cleaning operation; a further object is to provide means for cleaning any section of the boiler independently of the remaining sections, and in fine to provide further and other details the advantages of which will be clearly apparent from a detailed description of the invention, which is as follows:—

Referring to the drawings, and for the present to Figs. 1 to 4, inclusive, F represents the furnace, (the walls being broken away in parts) of a well known type of water-tube boiler (Babcock & Wilcox), S representing the shell of the boiler, and T the water tubes. As well understood in the art the water-tube portion is divided off into independent sections by baffle-plates *a*, the general draft being rearward and upward from the fire-box F′. Disposed along one of the side walls of the furnace opposite each section or division between and on either side of the baffle-plates are vertical openings O, tapering inwardly and closed by plates P set in the brick-work, through elongated slots *s* of which plates, the steam spray-nozzles are inserted to project jets of steam into, through and across the spaces between the water-tubes for removing any dirt, ashes or other foreign material which accumulates thereon from time to time. In the present case, I provide a steam supply or conducting pipe 1 leading from the steam-space of the shell, bringing the pipe down alongside the bottom of the furnace wall as shown. Along this portion of the steam pipe are disposed T's 2 to which (and to the pipe) are connected branches 3, provided with valves 4 of any conventional type, and terminating in hollow swivel joints 5 of any well known construction to be found on the market, from which joints lead headers 6 as shown. The headers (as well as the branches 3) are disposed at right angles to the inclined water-tubes, each header being provided with a handle or lever L by which axial rotation may be imparted to such header. Leading from each header are shunts or off-sets 7 disposed parallel to the wall of the furnace (for a central position of the parts as presently will more fully appear), the shunts progressively diminishing in length from bottom upward, whereby their outer ends are disposed in a common vertical line corresponding substantially to the central vertical axis of each opening O. From the shunts 7 lead nozzles 8 terminating in flaring spray-heads 9, the latter being provided with passages $m$ diverging from the passageway of the nozzle and disposed in the general plane of oscillation of the nozzle, a second downwardly trending passage-way $m'$ being formed in the bottom head 9′, opposite the middle section, and an upwardly trending passage-way $m'$ in the top head 9′ of the terminal section of the boiler, to direct a steam jet in the general direction of the line of draft, the passages $m$ projecting the steam across the space between the water-tubes. The upper ends of the headers are supported and have suitable bearings in straps 10 spanning the openings O and secured to the furnace wall. By means of the offsets 7, the bases of the nozzles are brought in the plane of the vertical axis of the opening O, and hence, when rotation is imparted to any header, the free ends of the nozzles can sweep across the full width of the reduced end of such opening. Otherwise, since the header 6 is inclined to such vertical axis of the opening O, the nozzles would strike the sides of the opening, and no rotation could be imparted to the header were it not for the gradually diminishing offsets 7 referred to.

By turning on the steam, seizing the handle L and imparting the necessary rotation to the header, the several nozzles can be oscillated across the opening O, the steam being projected in jets (which form a fan-like sheet) into, through and across the spaces between the water-tubes, the particular jet issuing from the port $m'$ assisting in the draft, since it projects the steam in the general direction of such draft. Each section of the water-tube portion of the boiler may thus be cleaned independently. Provision may however, be made to clean all the sections simultaneously by simply connecting the several handles L by a common link 11 (loosely coupled to all the handles) as shown in the modification in Fig. 5. In this modification the water-tube portion T′ of the boiler is set at a less incline from that of the first form described, and for practical purposes the headers 6′ may be mounted vertically, and the nozzles 8′ be coupled directly thereto without the use of shunts as the inclination of the tubes is insufficient to either interfere with the free oscillation of the nozzles, or prevent the steam jets from shooting across the spaces between the tubes. Of course, the object sought is to project the sheets or jets of steam as near parallel to the planes of the spaces between the tubes as possible, to insure that the steam reaches every portion of the exposed portion of the tube (instead of cutting across the tube), but in the modification alluded to (Fig. 5), this result is practically attained though perhaps not as perfectly as in the first type described, where the planes of oscillation of the nozzles are parallel to the planes of disposition of the water-tubes. To prevent the formation of a vacuum in the headers, and allow free influx of air thereinto at the proper time, the top of each header is provided with a vent-valve $v$ of any conventional type, the valve seating during the blowing operation, and unseating at the conclusion thereof to allow for free influx of air into the pipes to fill any vacuum tending to form therein, as a result of condensation of the steam.

The "central" position of the parts corresponds to that where the nozzles are on the center vertical line of an opening O and from which line they are free to oscillate in either direction to cause the steam jets to sweep the entire area of a given section as defined by the baffle plates $a$.

Owing to the presence of the baffle-plates $a$, the general direction of the line of draft from the fire-box as indicated by the arrows in Fig. 1, will be first up in front of the first plate, then down between the plates, and finally up again beyond the last plate. So that the bottom spray head opposite the center section between the baffles (Fig. 3) must be mounted so as to direct the passages $m'$ downward instead of upward, that is to say, they must be the reverse to the top spray-head opposite the terminal section (Fig. 6).

It will be seen from the foregoing that whatever be the inclination of the water-tubes, the nozzles 8 of the cleaner or soot-blower are arranged one above the other in vertical series, and as they are moved or swung with the rotation of the header 6 they follow the direction of the tubes, oscillating as they do in planes parallel to said tubes, said planes of oscillation being oblique to the vertical series arrangement of the nozzles. The nozzles 8′ on the other hand while likewise arranged one above the other in vertical series, need not oscillate in planes oblique to said vertical series arrangement thereof for reasons pointed out in the specification.

It may be stated by way of explanation that boiler-furnace walls of the type herein shown, are usually provided with vertical openings O for the accommodation of hand cleaners. With my invention these openings may be availed of, the vertical series disposition of the nozzles 8 when occupying a position opposite the central axis of an opening, permitting the nozzles to be swung across the full width of the throat (or narrow portion) of the opening. If the nozzles were arranged parallel to the inclined header 6 (which is at right angles to the tubes T) the nozzles at the bottom, with a rotation of the header in one direction, would foul one side of the throat before the top nozzles had described their full sweep;

and when the header was swung in the opposite direction, the top nozzles would foul the opposite side of the throat before the bottom nozzles had described their full sweep. This of course, could be obviated by improvising an opening whose major axis was parallel to the header 6, but an inclined opening would be an objectionable feature in furnace wall constructions. With my present arrangement the bases of the nozzles 8 are disposed along an element of a cone, the axis of which corresponds to the axis of the header 6, this element being brought into a central vertical position when opposite the major axis of the opening O, but being deflected (or caused to be inclined) from its verticality the moment it swings to one side or the other of this central position. This deflection is however, so slight between the limits of the arc of oscillation of the nozzles, as to be practically negligible during the operation of the blower.

Having described my invention, what I claim is:—

1. In combination with a furnace, a boiler having a series of water-tubes disposed in superposed parallel planes, a series of transversely disposed baffle-plates intersecting the tubes and dividing the boiler into independent sections, the side wall of the furnace being provided with openings opposite the sections, headers positioned opposite said walls, nozzles communicating with the headers and operating across the openings for projecting a cleaning fluid into and through the spaces between the tubes, and means for moving the discharge ends of the nozzles in planes parallel to the general planes of disposition of the tubes.

2. In combination with a furnace, a boiler having a series of water-tubes disposed in superposed parallel planes, the side wall of the furnace being provided with openings opposite the tubes, headers positioned opposite said walls, nozzles communicating with the headers and operating across the openings for projecting a cleaning fluid into, through, and across the spaces between the tubes, and means for moving the discharge ends of the nozzles in planes parallel to the planes of disposition of the tubes.

3. In combination with a boiler having series of water-tubes disposed in superposed inclined planes, a furnace inclosing said tubes, the wall of the furnace being provided with vertical side openings, a fluid-supply pipe disposed on the outside of the furnace wall, an axially rotatable header opposite an opening in the wall disposed substantially at right angles to the planes of disposition of the water-tubes, a series of offsets leading from the header, and nozzles extending from said offsets into the boiler furnace and projecting the fluid into and through the spaces between the tubes during the rotation of the headers, the several offsets being apportioned in length to bring the bases of the nozzles in line with the center of the opening in the furnace wall, said center corresponding to the center of the arc of oscillation of the nozzles.

4. In combination with a water-tube boiler, a fluid-ejecting and cleaning nozzle positioned on the side of the tubes and provided with passages projecting the cleaning fluid between the tubes and across the space between the tubes and an independent passage for directing the fluid in the general direction of the line of draft.

5. In combination with a boiler having a series of water-tubes disposed in superposed parallel planes, a series of transverse baffle-plates intersecting the tubes and dividing the boiler into independent sections, a steam-supply pipe, a rotatable header opposite each section carried by said pipe, a series of nozzles leading from each header toward the boiler and projecting the steam into and across the spaces between the tubes, a lever arm projecting in the opposite direction from each header, and a link pivotally coupled to the several lever arms whereby the several headers may be rotated in unison and the several sections of the boiler cleaned simultaneously.

6. In combination with a boiler having a series of inclined water-tubes disposed in superposed parallel planes, a series of transversely disposed baffle-plates intersecting the tubes and dividing the boiler into independent sections, a steam-supply pipe, a header rotatably coupled to said pipe opposite each boiler section and disposed substantially at right angles to the water-tubes, a series of offsets or shunts of progressively diminishing length leading from each header, and nozzles extending from said offsets toward the water-tubes for projecting jets of steam into, and through the spaces between the tubes during the rotation of the headers, the bases of the nozzles being disposed along a substantially vertical line.

7. In a soot-blower for water-tube boilers having inclined tubes, a set of nozzles arranged one above the other in vertical series, and means for causing said nozzles to follow the direction of the tubes, whereby the nozzles move in planes oblique to the said vertical series arrangement thereof.

8. In combination with a furnace, a boiler having a series of water-tubes disposed in superposed parallel planes, the side walls of the furnace being provided with openings opposite the tubes, headers positioned between the vertical planes passing through the outer edges of the openings, out of range of the combustion products, nozzles communicating with the headers and operating across the openings for projecting a cleaning fluid into, through, and across the spaces between the tubes, and means for moving the discharge ends of the nozzles in planes parallel to the planes of disposition of the tubes.

9. In a soot-blower for water tube boilers having inclined tubes, a set of nozzles opposite the sides of the tubes arranged one above the other in vertical series, and means coupled to the nozzles for causing said nozzles to follow the direction of the tubes, whereby the nozzles swing in planes oblique to the said vertical series arrangement thereof.

10. In a soot-blower for water-tube boilers, having inclined tubes, a set of oscillating nozzles arranged one above the other in vertical series, and means for causing said nozzles to move in the general direction of the tubes, whereby the nozzles oscillate in planes oblique to the vertical series arrangement thereof.

11. In a soot-blower for water-tube boilers having inclined tubes, a set of oscillating nozzles arranged one above the other along a common vertical line, and means for moving said nozzles in the general direction of the tubes whereby they oscillate in planes oblique to the said vertical line.

12. In combination with a water-tube boiler having inclined tubes, a furnace inclosing said boiler, the wall of the furnace being provided with a side opening opposite the tubes, a rotatable fluid-supply pipe disposed opposite the tubes and substantially at right angles to the tubes, and nozzles communicating with the pipe and arranged one above the other in vertical series, and means for swinging the nozzles across the opening aforesaid in planes substantially parallel to the tubes and at an incline to the vertical series arrangement of the nozzles.

13. In combination with a water-tube boiler having inclined tubes, a furnace inclosing said boiler, the wall of the furnace being provided with a side opening opposite the tubes, a rotatable header disposed on the outside of the furnace wall opposite the tubes and substantially at right angles to the tubes, and nozzles communicating with the header and arranged one above the other in vertical series and playing across the opening aforesaid, and means whereby upon rotation of the header, the nozzles will sweep in planes parallel to the boiler tubes and at an oblique angle to the vertical series arrangement of the nozzles, and project the cleaning fluid into the spaces around the tubes.

14. In a soot-blower for water-tube boilers having inclined tubes, a rotatable header mounted opposite the tubes at right angles thereto, and nozzles disposed one above the other in vertical series and communicating with the header, and means whereby upon rotation of the header, the nozzles will sweep in planes parallel to the tubes and oblique to the said vertical series arrangement of the nozzles.

15. In a soot-blower for water-tube boilers having inclined tubes, a set of oscillating nozzles opposite the tubes arranged one above the other in vertical series, and means for causing said nozzles to move in planes parallel to the general direction of the tubes.

16. In a soot-blower for water-tube boilers having inclined tubes, a set of oscillating nozzles opposite the tubes arranged along a common vertical line, and means for causing said nozzles to oscillate in planes parallel to the general direction of the tubes and oblique to said vertical line.

17. In a soot-blower for water-tube boilers having inclined tubes, a set of nozzles opposite the tubes arranged one above the other in vertical series, and means for imparting movement to the nozzles in planes substantially parallel to the general direction of the tubes.

18. In a soot-blower for water-tube boilers having inclined tubes, a set of nozzles arranged one above the other in vertical series, and means for causing said nozzles to follow the direction of tubes and operating to incline said series alternately in opposite directions relative to said vertical arrangement thereof, the nozzles moving in planes oblique to said vertical series arrangement.

19. In a soot-blower for water-tube boilers having inclined tubes, a set of oscillating nozzles opposite the tubes arranged one above the other in vertical series, and means for causing said nozzles to move in planes parallel to the general direction of the tubes and operating to incline said series in opposite directions relative to said vertical arrangement thereof, the nozzles moving in planes oblique to said vertical series arrangement.

20. In a soot-blower for water-tube boilers having inclined tubes, a set of nozzles arranged one above the other in vertical series, and means for causing said nozzles to follow the direction of the tubes and operating to incline said series relative to said vertical arrangement thereof, the nozzles moving in planes oblique to said vertical series arrangement.

21. In a soot-blower for water-tube boilers having inclined tubes, a set of oscillating nozzles opposite the tubes arranged along a common vertical line, and means for causing said nozzles to oscillate in planes parallel to the general direction of the tubes, and oblique to said vertical line, and operating to incline said series relative to said vertical line during the oscillation of the nozzles.

22. In a soot-blower for water-tube boilers having inclined tubes, a set of nozzles opposite the tubes arranged one above the other in vertical series, and means for imparting movement to the nozzles in planes substantially parallel to the general direction of the tubes and operating to incline said series relative to the vertical arrangement thereof during the movement of the nozzles.

23. In a soot-blower for water-tube boilers having inclined tubes, a set of nozzles opposite the tubes arranged one above the other in vertical series, and means for imparting movement to the nozzles in planes substantially parallel to the general direction of the tubes and operating to incline said series in opposite directions relative to the vertical arrangement thereof during the movement of the nozzles.

In testimony whereof, I affix my signature, in presence of two witnesses.

LEO JNO. BAYER.

Witnesses:
EMIL STAREK,
JOS. A. MICHEL.